(12) United States Patent
Feigin et al.

(10) Patent No.: US 8,102,298 B2
(45) Date of Patent: Jan. 24, 2012

(54) ULTRA-WIDEBAND RADAR WAVEFORM CALIBRATION FOR MEASUREMENTS OF A HETEROGENEOUS MATERIAL

(75) Inventors: Jeffrey R Feigin, Andover, MA (US); Alan E Schutz, Newburyport, MA (US)

(73) Assignee: Geophysical Survey Systems, Inc., Salem, NH (US)

( * ) Notice: Subject to any disclaimer, the term of this patent is extended or adjusted under 35 U.S.C. 154(b) by 0 days.

(21) Appl. No.: 13/157,795

(22) Filed: Jun. 10, 2011

(65) Prior Publication Data

US 2011/0234444 A1    Sep. 29, 2011

Related U.S. Application Data

(62) Division of application No. 12/620,036, filed on Nov. 17, 2009, now Pat. No. 7,982,657.

(51) Int. Cl.
*G01S 13/00*    (2006.01)
(52) U.S. Cl. ............... 342/22; 342/159; 342/195

(58) Field of Classification Search ............. 342/22, 342/159, 195
See application file for complete search history.

(56) References Cited

U.S. PATENT DOCUMENTS

| | | | | |
|---|---|---|---|---|
| 4,228,517 A | * | 10/1980 | Constant | 708/322 |
| 5,075,863 A | * | 12/1991 | Nagamune et al. | 702/159 |
| 5,835,054 A | * | 11/1998 | Warhus et al. | 342/22 |
| 2007/0274152 A1 | * | 11/2007 | Rees | 367/7 |

* cited by examiner

*Primary Examiner* — Timothy A Brainard
(74) *Attorney, Agent, or Firm* — Michael J. Feigin, Esq.

(57) ABSTRACT

Embodiments of the disclosed technology comprise a ground penetrating radio device and methods of use for obtaining greater resolution. This is achieved by measuring the composition/reflection off a homogeneous material (e.g., metal plate), determining coefficients to correct the measured/reflection in order to make the measurements look like an idealized reference signal, and then using these coefficients in a digital filter to correct measurements/a reflection off a heterogeneous material, such as a road surface. In this manner, the composition of the heterogeneous material is determined with greater accuracy.

9 Claims, 7 Drawing Sheets

ULTRA-WIDEBAND RADAR WAVEFORM CALIBRATION FOR MEASUREMENTS OF A HETEROGENEOUS MATERIAL

FIELD OF THE DISCLOSED TECHNOLOGY

The disclosed technology relates generally to ground-penetrating radar (GPR), and, more specifically, to a technique for calibrating the measurement system response.

BACKGROUND OF THE DISCLOSED TECHNOLOGY

GPR, or ground-penetrating RADAR (where RADAR is "RAdio Detection And Ranging), is a technology used to assess the composition and location of heterogeneous materials. GPR uses common radio frequencies and is particularly useful in that it is both non-destructive and non-ionizing. In fact, GPR uses frequencies similar to a cellular phone, but at far lower power levels. Common applications include locating the precise position of rebar within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface of less than one inch (2.54 cm) is desired. Such systems may be mounted on vehicles, travelling over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

There are two common types of GPR for road/bridge surface measurement: Ground-coupled and air-launched. Both may operate on an ultra-wideband frequency range. However, in the current state of the art, neither is completely accurate or repeatable in their measurement response for a given scenario. Noise and distortion affect the system and, in fact, the transmit pulse itself has varying degrees of accuracy compared to what is intended to be transmitted. For example, the pulse may last an extra few nanoseconds longer than intended or the present pulse may not have finished reflecting back at the receiver before the next pulse is transmitted, causing distortion or interference. Further, the receiver may introduce additional distortion and time-domain blurring. The amplitude of the pulse at a given subset of the transmission frequency may also vary. Reflections may return at different times due to multipath distortion and clutter.

Presently, the known methods and devices which account for distortion and interference function by calibrating the transmitting signal based on a reflection off a metal plate. Then, the received reflection when reflecting off of a heterogeneous material, such as a road surface, is calculated by subtracting from the result the received reflection off the metal plate. Similarly, distortions due to reflections off of a vehicle on which the antenna is mounted may be subtracted. This, however, is imprecise because the actual signal transmitted may vary with each transmission and, in fact, the actual characteristics of the signal are not known' that is, there is a difference between an ideally transmitted signal and the actual transmitted signal. Even when this error is within a few nanoseconds, a noticeable decrease in resolution, in a GPR system, results.

Thus, there remains an unsolved need in the art to provide a GPR device or method which provides, or corrects, for errors in the transmit pulse signal or receipt thereof.

SUMMARY OF THE DISCLOSED TECHNOLOGY

Therefore, it is an object of the disclosed technology to adjust the transmit and/or received pulse signal used in GPR to an idealized signal or, at least, closer to what an ideal signal would be.

It is a further object of the disclosed technology to remove multipath distortion in GPR and/or align received signals.

It is a further object of the disclosed technology to adjust a transmit or received pulse of a GPR system to match a response of a bandpass system with a flat magnitude response and a linear phase response.

An embodiment of a device of the disclosed technology is ground-penetrating radar (GPR) device. The GPR device has a transmitting and receiving antenna which transmits and receives ultra-wideband pulses, an analog-to-digital converter, a delay-tap filter equalizing a measurement response received by the antenna, and a measurement system for determining the composition of a heterogeneous material.

The equalizing may be performed in real-time or as a part of post processing, and may be based off a previous response, received by bouncing the pulses off a homogeneous material (e.g., a metal plate) and providing gleaned adjustments (e.g., equalization) from this response to equalize a response off a road surface. The previously determined response may be a response at a known distance from the homogeneous material, e.g., to use the same distance when equalizing a response off of a road surface.

Further, coefficients of the predetermined and present equalizing (see prior paragraph) may be determined based on variations in the antenna, that is, the antenna's response at different frequencies or the antenna's response relative to other antennas used with the device simultaneously or previously. Such equalizing may in addition or instead be determined based on temperature, that is, that the antenna's response varies depending on the temperature in which it is functioning.

Still further, an equalizing profile may be used (that is, data representing coefficients used to modify the signal), and a different profile may be used depending on the factors recited in the prior paragraph and/or, additionally, a known feature of said composition of the heterogeneous material or a known feature of the location where said system is being employed.

Still further, the delay-tap filter may minimize the width and delay time of each of a plurality of pulses transmitted by the antenna.

In a method for shaping an ultra-wideband signal reflected off a heterogeneous material is also disclosed and claimed. The method proceeds by transmitting a plurality of ultra-wideband pulses, receiving (a reflection of) the plurality of ultra-wideband pulses, passing each pulse through a bandpass system with a flat magnitude response and a linear phase response (which may further involve modifying the width and delay time of each pulse), and determining a composition of a heterogeneous material based on the transmitting, receiving, and passing. Alternatively, the passing step may be a processing step where each received pulse is processed with a bandpass system that is induced to have a more flat magnitude response and a more linear phase response than the received response (the response in the step of receiving a reflection of the plurality of ultra-wideband pulses). The step of passing each pulse through a bandpass system with a flat magnitude response and a linear phase response may be performed in real-time or as a part of post processing.

The step of passing/processing may further be carried out based on equalizing a response off a road surface, based on a previously determined response off a homogeneous material (e.g., a metal plate). The previously determined response may be a response at a known distance from the homogeneous material.

As in the device of the disclosed technology, the equalizing may be based on/vary based on, temperature, a known feature of the composition of the heterogeneous material (e.g., type of road surface and anticipated response), a known feature of a location where the method is being carried out (e.g., anticipated distortion or interference), or the like.

DETAILED DESCRIPTION OF EMBODIMENTS OF THE DISCLOSED TECHNOLOGY

Embodiments of the disclosed technology relate to ground-penetrating radar (GPR) systems and devices for measuring the composition of a heterogeneous material, such as the ground-using radio frequency (RF) response to measure same. The present technology solves a problem whereby the transmitted signal in GPR, even a signal measured under a controlled scenario, such as when reflecting the signal off a homogeneous material, is not as ideal as one would like it to be. As such, the resulting returned waveform yields less than ideal data related to the composition of a material being tested, because even the exact characteristics of the controlled signal are not known. For example, the received pulse may have a time delay, scattering, multipath distortions, extend for longer than intended, and so forth. This may vary as a function of temperature or the characteristics of a GPR hardware used (including antenna).

The disclosed technology is a device for, and method of, correcting a measurement response which may vary from one device to another, due to temperature changes, or due to differences in antenna pickup or interference at various frequencies. This is accomplished by passing/processing pulses, either in real-time or as a part of post processing, through a bandpass system with a flat magnitude response and a linear phase response. Different profiles may be used to configure the processing based on the above-listed factors, such as a change in temperature. In this manner, in a calibration phase, the response of a GPR system under controlled circumstances is modified to make the signal more ideal (e.g., like a reference waveform), and coefficients uncovered, which are used to idealize the signal, are also used to modify the response of a GPR system in a second phase, the measuring of a composition of a heterogeneous material.

Figure 1:
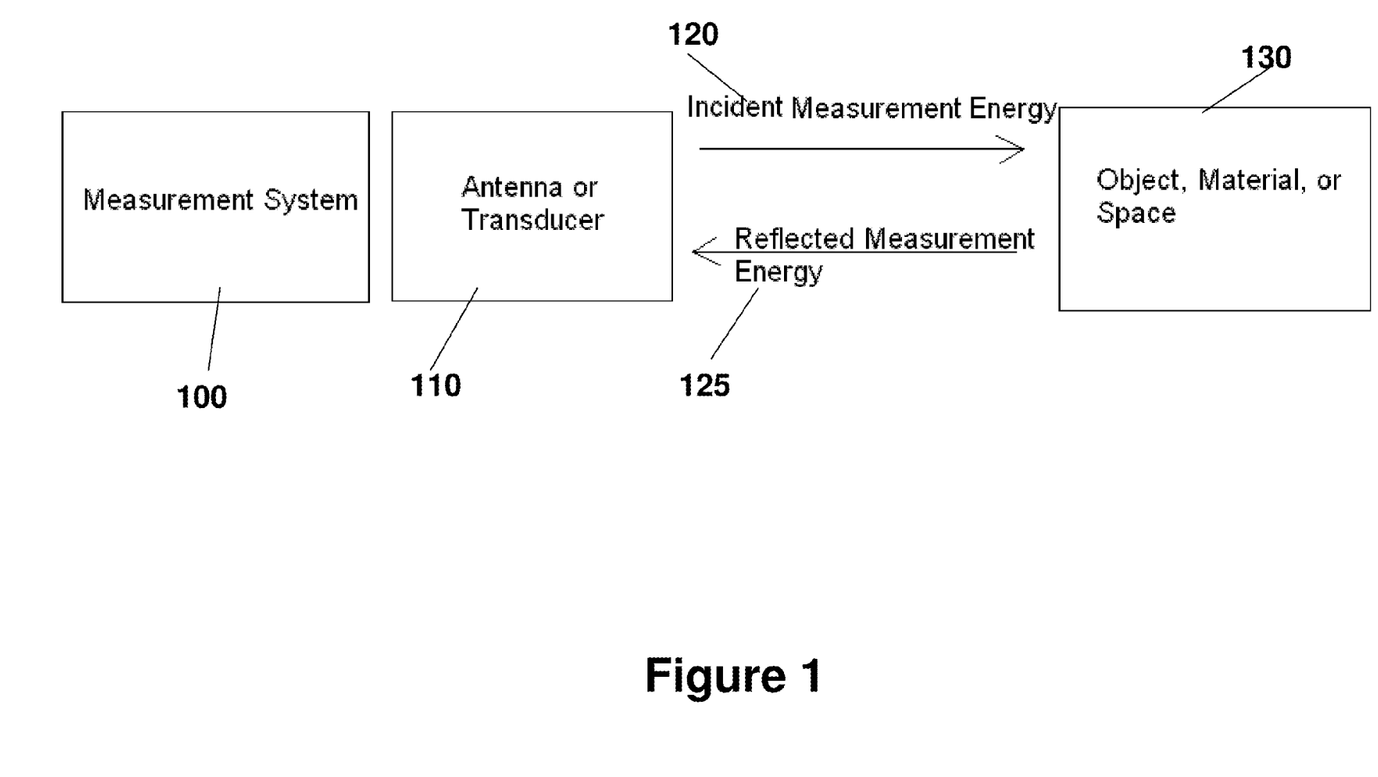
FIG. 1 shows a high level block diagram of an ultra-wideband ground-penetrating radar system which may be used to carry out embodiments of the disclosed technology.
Figure 2:
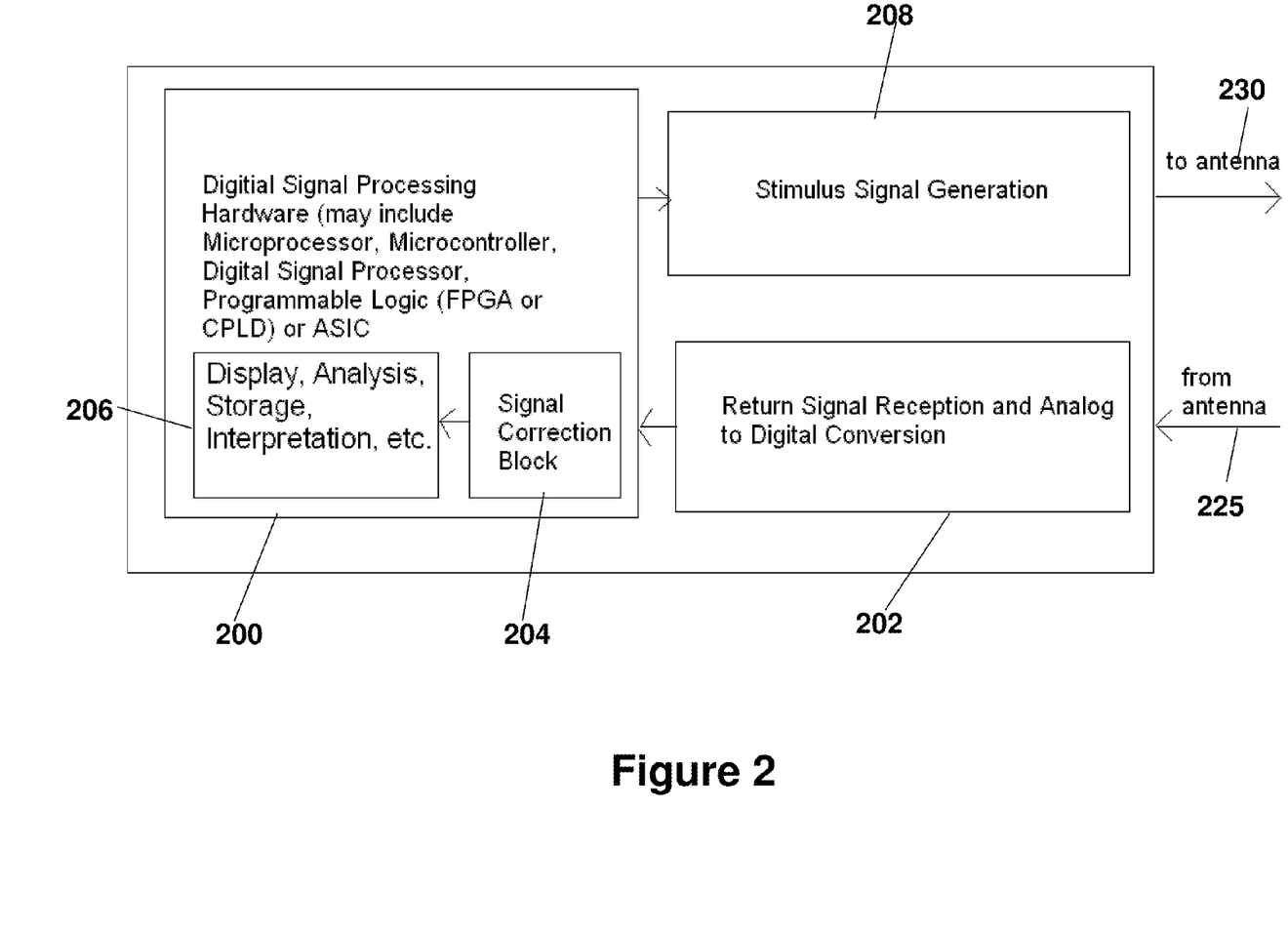
FIG. 2 shows a measurement device used in embodiments of the disclosed technology to equalize a GPR response in an embodiment of the disclosed technology.
Figure 3:
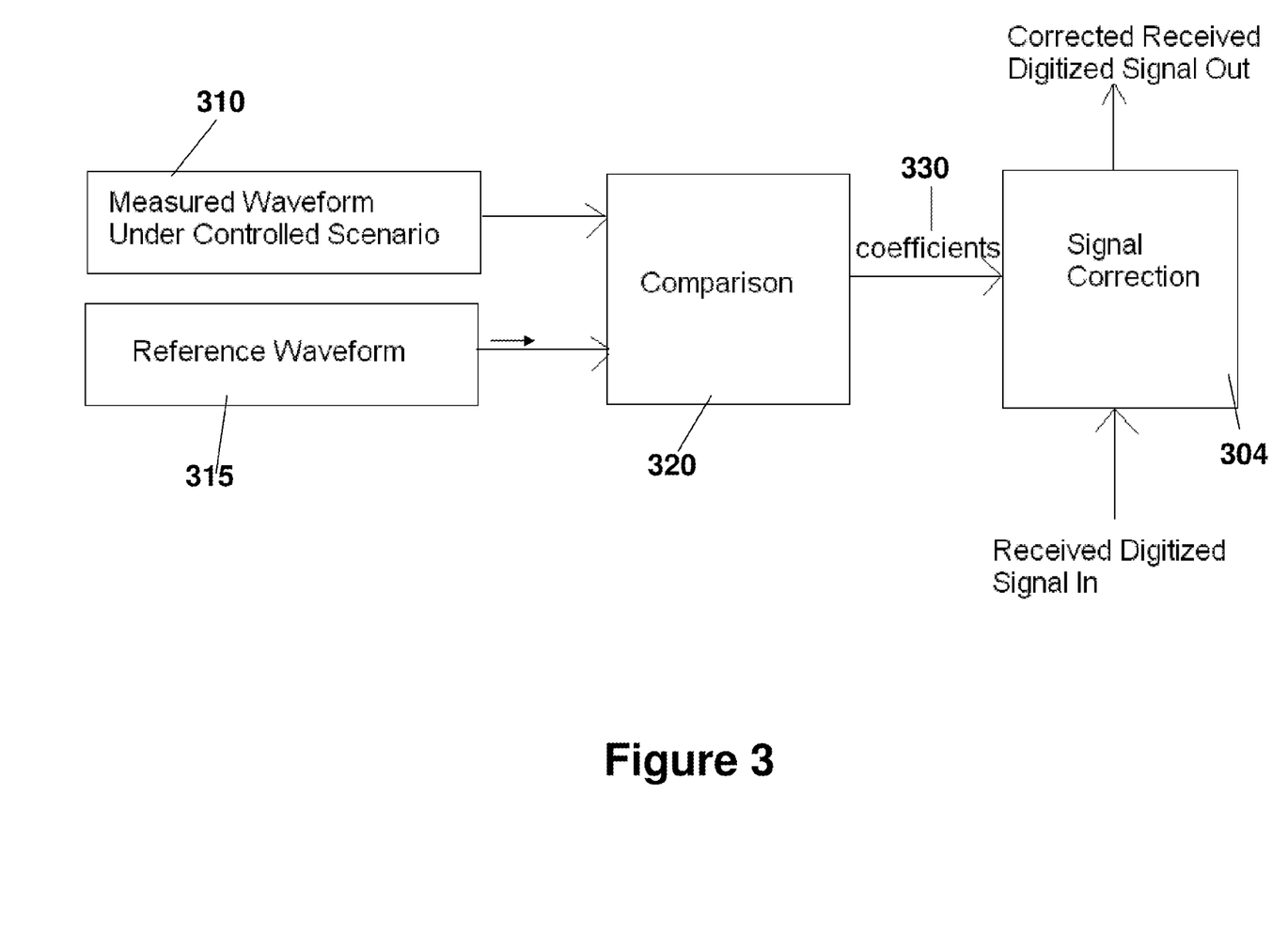
FIG. 3 shows a high level block diagram of a method of determining a response of a band pass filter or other digital filter to equalize a response of a GPR device in an embodiment of the disclosed technology.
Figure 4:
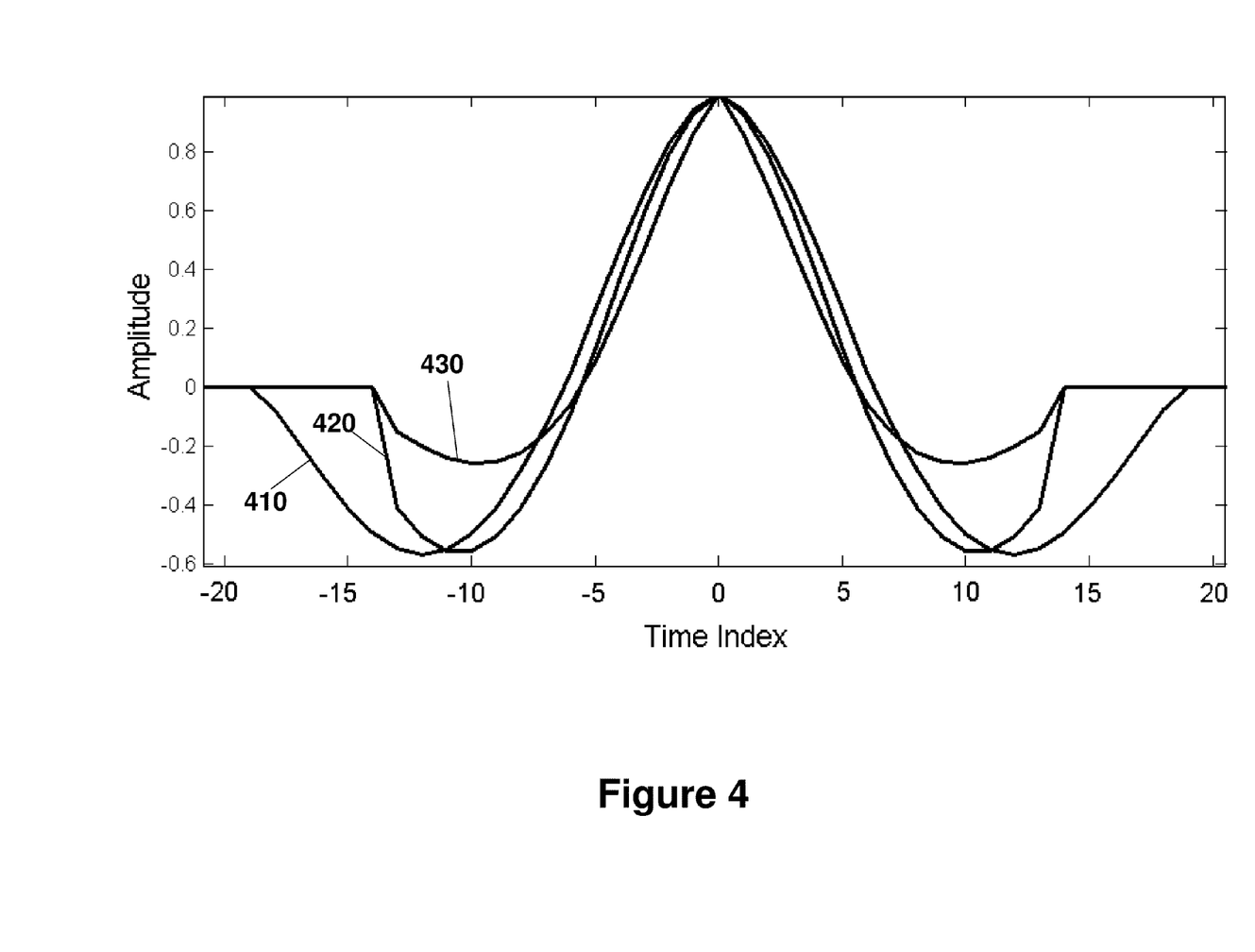
FIG. 4 shows various waveforms which may be generated as reference waveforms.
Figure 5:
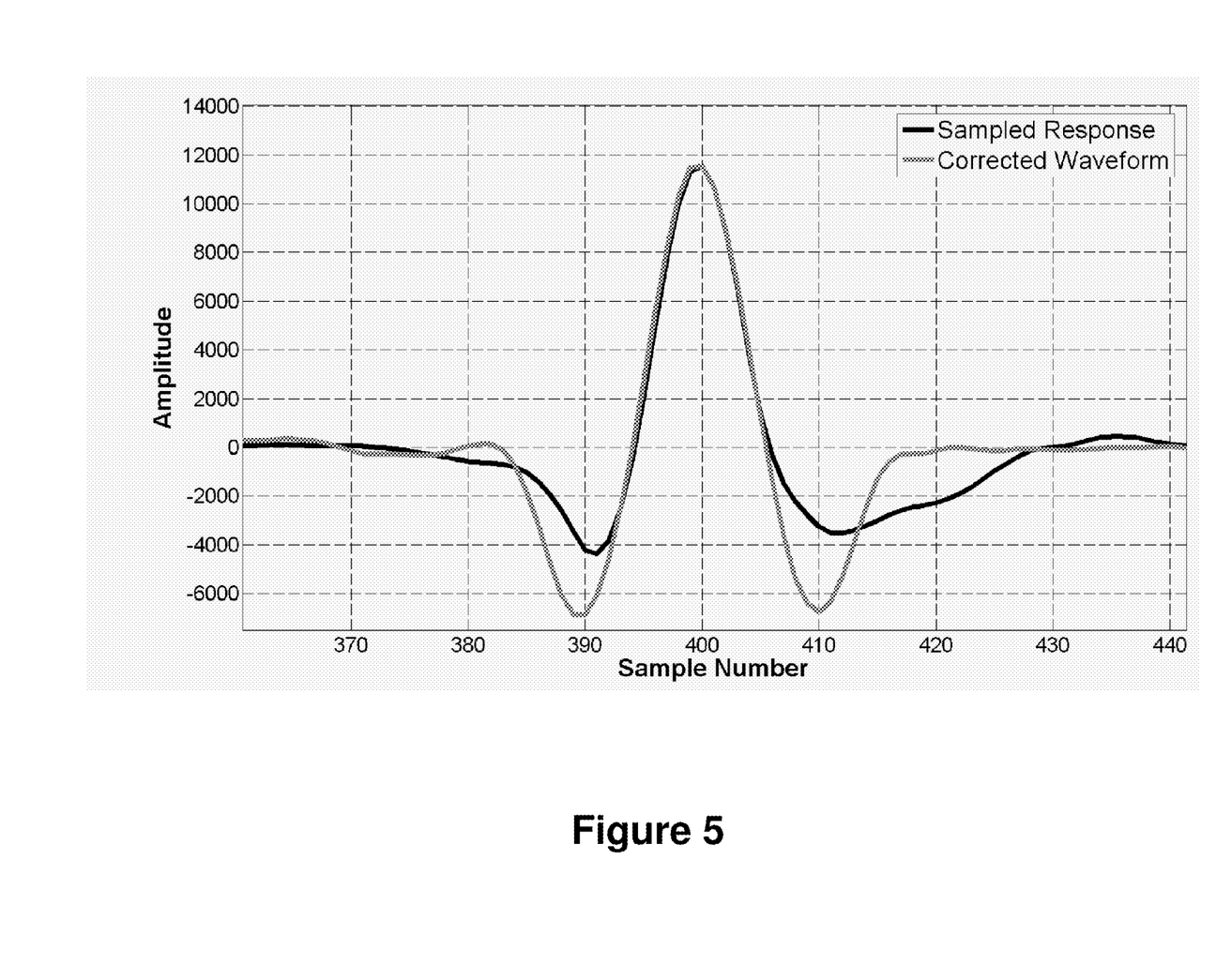
FIG. 5 shows an actual measured UWB radar response of a metal-plate reflector (homogeneous material) and its subsequent equalization and correction.
Figure 6:
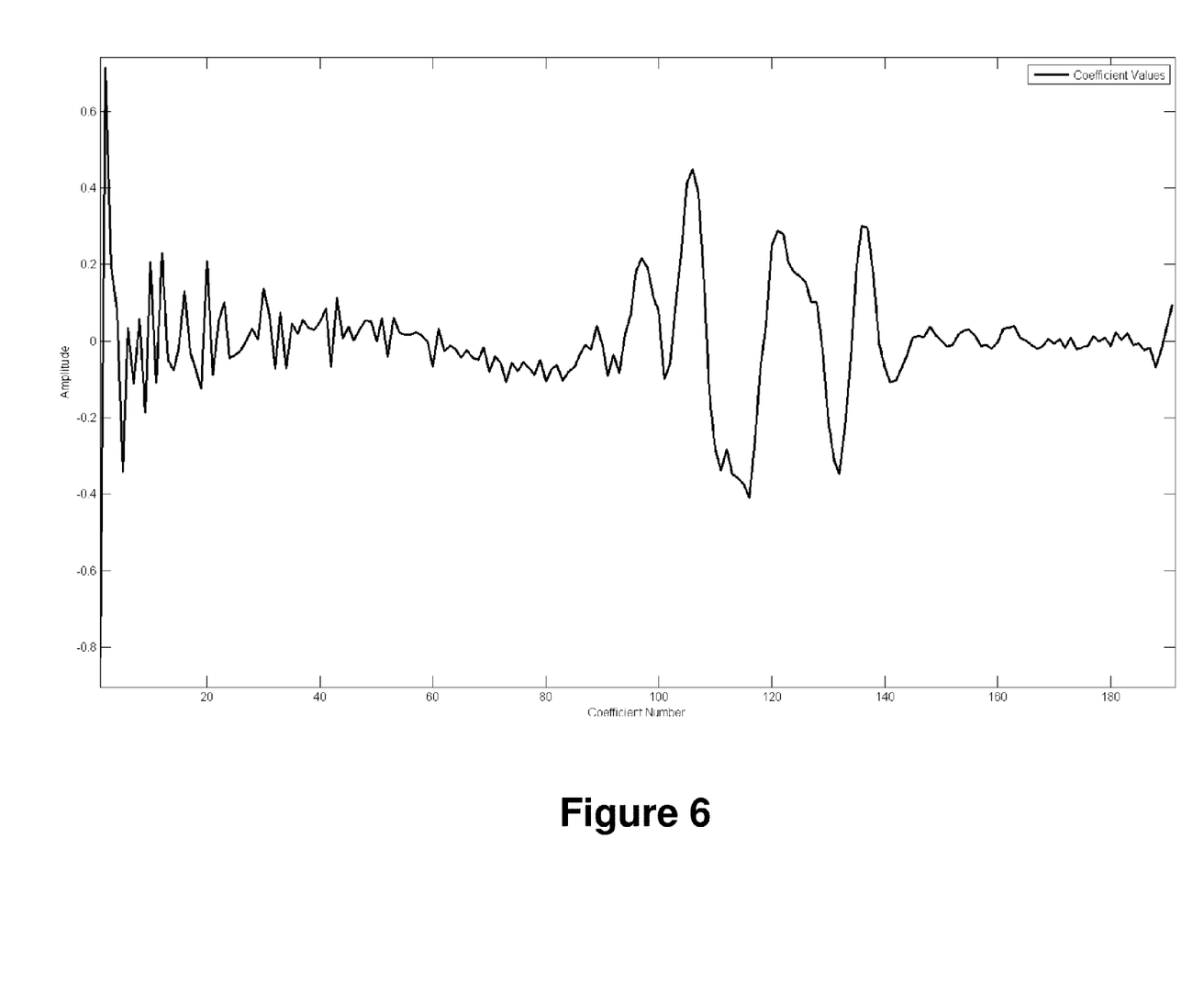
FIG. 6 shows a coefficient set used to correct and equalize inputted waveform as defined based on carrying out the steps of the method of the disclosed technology.

Embodiments of the disclosed technology will become clearer in light of the description of the figures, below. FIGS. 1 and 2 show high level block diagrams of devices used to carry out embodiments of the disclosed technology. FIG. 3 shows a high level method of carrying out embodiments of the disclosed technology, such as by way of using the devices shown in FIGS. 1 and 2. FIGS. 4, 5 and 6 show graphical representations of data discovered/used in embodiments of the disclosed technology.

FIG. 1 shows a high level block diagram of an ultra-wideband ground-penetrating radar system which may be used to carry out embodiments of the disclosed technology. A measurement system 100 receives and carries out measurement functions on a reflected RF (radio frequency) signal. The measurement system may also direct the incident RF signal to be transmitted. The measurement system may be one comprising any or a plurality of logic, computational inputs and outputs, oscilloscope, TFT (thin-film transistor) LCD (liquid crystal display) monitor, and ability to execute code. A measurement system may also comprise elements such as those shown and described further with reference to FIG. 2 and FIG. 7, as well as the prior art cited in the background section or information disclosure statement. An antenna or transducer 110, such as a horn antenna, propagates an RF (radio frequency) signal towards a material to be analyzed. The RF signal is typically a UWB (ultra wide-band) transmission, which is defined as signal whose bandwidth is either greater than 500 MHz or more than 20% of the center frequency. In the calibration step, the RF signal is reflected off a homogeneous material, such as a metal plate (not shown). In an analysis step, i.e., during an analysis of a heterogeneous material to determine its makeup, the RF signal is reflected off the heterogeneous material, such as heterogeneous material 130. The heterogeneous material 130 may be a road surface, wall, ground, or other structure or space. Materials, in a roadway surface, may comprise a chip surface, pavement layers, gravel, and so forth. The incident measurement energy 120 is transmitted from the antenna 110, reflects off the heterogeneous (or homogeneous) material 130, and the reflected measurement energy 125 is measured (received through the antenna). In embodiments of the disclosed technology, antenna is used to refer to a transmitting antenna, a receiving antenna, an antenna carrying out both the functions of transmitting and receiving, and an array of individual antennas carrying out the functions of transmitting and/or receiving.

Referring still to FIG. 1, measurements taking place in embodiments of the disclosed technology are for the purpose of assessing the structure, position, shape, and/or velocity of heterogeneous materials placed within a measurement space (that is, where a signal may be transmitted, reflected off the material, and received again). The measured response is adapted in order to adjust or change the appearance and/or anticipated interpretation, so as to compensate for implementation-specific hardware characteristics of the ultra-wideband measurement system.

FIG. 2 shows a measurement device used in embodiments of the disclosed technology to equalize a GPR response in an embodiment of the disclosed technology. Put another way, the measurement device is used to idealize data (make more ideal or closer to a reference waveform), such as radio frequency data, reflected off a heterogeneous object. Where applicable, items shown in FIG. 2 have been incremented by 100 over items shown in FIG. 1. The measurement system 200 comprises a signal generator (stimulus signal generation) 208 which generates an ultra-wideband pulse.

Referring now to FIGS. 1 and 2 simultaneously, the pulses transmitted are typically in the form of short pulses of high-frequency waves (e.g., greater than 500 MHz), such as polarized waves, into the medium to be analyzed (such as the object 130 undergoing testing in FIG. 1. which is sent to an antenna (arrow 230) and becomes the incident measurement energy 120. A reflected pulse or measurement energy 125 is received back from the antenna (arrow 225). It is further noted that it is possible to build this system using separate antennas for transmitting and receiving. The frequencies used may be all at once or added separately, using principles of superposition. An antenna, such as antenna 110, or other transmitter, propagates the signal.

In block 202, the return signal is received and, using an analog to digital converter, the signal is converted to a digital signal for further processing. One of the functions of the signal correction block 204, which will be described in greater detail with reference to FIG. 3, is to filter the return pulses and align them to correct multipath distortions. The signal correction block 204 is an inline FIR (and/or IIR) filter, populated with the derived coefficients, and is then used to modify all subsequently measured responses of the system to resemble the response associated with the reference waveform. The signal correction block 204 is implemented within signal processing hardware (which may be a Microprocessor, Digital Signal Processor, ASIC, Programmable Logic, or the equivalent) and modifies the received (reflected) waveform to have certain characteristics. Such characteristics may include, but are not limited to, improved measurement consistency, a return waveform with more or less symmetrical shaping, a return waveform that appears to have greater or lesser bandwidth, reduction in noise or interference, removal of undesired reflections and ringing, and adjusting the length of the response.

In order to configure the signal correction block 204, an expectation based on frequency characteristics of an antenna is used. An expectation of what the reflected signal/pulse waveform should look like based on what was transmitted or intended to be transmitted is determined and used to equalize the actual return signal/pulse and shape the waveform into the expected shape. Based on such a calibration for each antenna where multiple antennas as used, all antennas will return the same response (within an acceptable tolerance level) based on digital calibration in the signal correction block 204. Still further, even within a single antenna, the response changes based on temperature. Therefore, again, based on an expected response, such as at room temperature, the change in response at other temperatures can be measured (such as when bouncing the signal off a homogeneous material) and calibrated accordingly. Once a calibration profile is developed, that is, the coefficients used to adjust/equalize the signal, it may be applied to a reflection off and measurement of a composition of a heterogeneous material.

Referring still to the signal correction block 204, a delay-tap transversal filter is used in embodiments of the disclosed technology to modify (e.g., equalize) the returned signal. The response of the digital filter is determined based in part on a calibration phase (under a controlled scenario), whereby the stimulus signal generation 208 is transmitted to an antenna 110, and the object under test 130 is a metal plate or homogeneous material. The response of the digital filter/delay-tap transversal filter is then calibrated, such as by defining a plurality of coefficients, so as to equalize the signal or waveform of the transmit signal. It should also be understood that between the reflected measurement signal 225 (analog signal) obtained by the antenna 110 and the digital filter is an analog-to-digital converter. The purpose of this device is to convert the analog signal generated at 208 into a digital signal which is processable by the delay-tap transversal filter. A display, analysis, storage, interpretation, and control center 206 is also disclosed and shown which comprises features such as an LCD display, ability to execute logical functions and calculations, store data in, hardware memory, and the like.

FIG. 3 shows a high level block diagram of a method of determining a response of a band pass filter or other digital filter to equalize a response of a GPR device in an embodiment of the disclosed technology. In step 310, a waveform is measured under a controlled scenario in a calibration phase. A reference waveform, in step 315, is provided which is an ideal waveform, or what one would want the waveform generated in the calibration phase to look like, within an acceptable tolerance level defined by the user. By way of carrying out a comparison in step 320, the response of the measured waveform under the controlled scenario in the calibration phase in step 310 (e.g., bouncing the signal off a metal plate or other homogeneous material) is compared to the reference waveform 320. The finite impulse response (FIR) and/or infinite impulse response (IIR) coefficients 330 are estimated according to the optimization of a cost function (such as the Least Squares criterion) between the reference waveform and "Signal Correction Block" output when the filter is configured to measure the return response under a known (or "training") scenario (i.e., using the devices shown in FIG. 1 or 2 to measure the impulse response of a metal plate placed three feet away from the antenna). The Least Squares criterion is estimated according to any one of the weighted or unweighted Linear Least Squares Estimator (LLSE), Least Mean Squares (LMS), Constrained Least Squares Estimation (CLSE), Recursive Least Squares (RLS), Steepest Descent, Newton's Method, or other similar cost function minimization technique. Subsequently, the coefficients are refined, sometimes using a time-domain weighting function (certain parts of the waveform are emphasized such that they have a greater impact on the cost function used in the estimation) using one of the previously mentioned minimization techniques.

In this manner, the coefficients 330 are used to shape the calibration wave form (described in step 310) to look like the reference wave form (described in step 320). These coefficients 330 are used in a step of signal correction 304 which may be carried out in the signal correction block 204 of FIG. 2. That is, future measurements by way of real-time processing (such as while the measurements are being acquired) or post-processing (such as by modifying measurements acquired which have already been stored on a data storage device) are modified (e.g., equalized) based on the coefficients 330. Thus, a received digitized signal, such as a signal from an antenna 225 which passes through an analog-to-digital converter/conversion 202 is modified based on the coefficients 330 determined in the method shown and described with reference to FIG. 3. Then, the output digital signal is corrected. A signal modified during the signal correction phase 304 may be a signal or data received related to the composition of a heterogeneous material, such as a road surface. The signal modified may also relate to another GPR device or another antenna being calibrated.

Referring further to the reference waveform described with reference to step 315, this waveform is either a similar waveform, but recorded on one particular measurement system (usually with improved characteristics), or is generated by means of a computer algorithm according to certain specifications. In an embodiment of the disclosed technology, the reference waveform should have power spectral density that does not exceed about 6-10 dB (depending upon noise tolerance) at any point in the spectra. This ensures optimum utilization of the available radar reflection energy without excessively enhancing the noise. There are, however, no restrictions on the phase relationship between the spectrum of the sampled radar waveform and the reference waveform. For UWB radar applications utilizing sent and reflected (received) pulses, the measurement systems generally have a bandpass frequency response, and a symmetric reference waveform may be generated according the following (or similar) function:

$$r_n = \begin{cases} (e^{(j2\pi\alpha+\beta)\cdot|n|})\left(1 - \frac{|n|}{d}\right)^{-1} & |n| \leq d, \ n \neq 0 \\ 1 & n = 0 \end{cases} \quad \text{Equation 1}$$

where n is an integer, d is a slope factor that represents the sharpness of the decay, α relates to the center frequency, and β relates to the damping. As the parameters of this waveform generation function are easily adjusted to produce a spectral magnitude function that is similar to the sampled radar metal-plate reflection, its phase spectra is linear, such that the time domain function is in a very compact form.

Further, impairments of the ideal UWB response that are coincident with RF interference filtering, limitations or imperfections of the hardware, undesired reflections, and other waveform artifacts are corrected through an equalization method. This equalization method utilizes a flat transfer function with minimal group delay variation, and is used to reduce or remove ringing and reverberation. A bandpass filter may be employed which aids in this equalization.

FIG. 4 shows various waveforms which may be generated as reference waveforms. These include any one of reference waveforms 410, 420, or 430. Referring further to the comparison step 320 of FIG. 3, the sampled radar response is compared to the reference waveform, and a set of coefficients 330 is generated according to a transversal delay-tap sampling model (in the form of a Finite Impulse Response, or FIR filter), but may also include Recursive (IIR) taps when necessary. This digital functionality can be equivalently implemented in the Frequency Domain rather than the time domain, by manipulating the transfer functions of the measurement rather than its time domain impulse or near-impulse response. These coefficients, referred as 'b', are first estimated by unweighted Linear Least Squares Estimation (LLSE) according to:

$$b = (M^T M)^{-1} M^T R \quad \text{Equation 2}$$

Here, M is an L by N matrix where T is the matrix transpose, N indicates the number of samples considered, and L refers to the number of taps to be estimated. M is a Toeplitz Matrix whose first column is defined as:

$$[m_0, \ldots, m_{N-1}, \xi_L]^T \quad \text{Equation 3}$$

and $m_n$ is sampled, peak-aligned RADAR reflection waveform index by n, while $\xi_L$ is a row matrix of length L containing zeros. Finally, R relates to r as:

$$R = [r_0, \ldots, r_{N-1}, \xi_L]^T \quad \text{Equation 4}$$

The estimate for the FIR coefficients may now be used to correct the incoming waveform or further updated using an iteration technique such as Steepest Descent or the Newton-Raphson algorithm. This further parameter estimation is particularly useful when the chosen cost function differs from the Least Squares criterion or a specific portion of the corrected waveform is weighted to have more or less relevance in the Means Square Error cost function. The Steepest Descent form, whose implementation is simpler than Newton-Raphson, is performed as:

$$b_{i+1} = b_i - \mu \cdot \nabla C(b_i) \quad \text{Equation 5}$$

Where b is iterated according to index i. μ represents a gain coefficient whose purpose is to balance stability versus update speed while $\nabla C(b_i)$ is the gradient of the cost function, C, with respect to each coefficient of b. This gradient-cost function can easily be extended to include IIR coefficients. In its simplest form, the cost function is the MSE between the reference waveform and the corrected radar response, but can be adapted for numerous other coefficient generation goals. The gradient is calculated numerically, by finding the ratio in the change in the resultant cost function and a specific amount that each constituent coefficient is varied from its nominal value. Two forms of the cost function, C, are derived from this relationship:

$$z = Mb \quad \text{Equation 6}$$

Which applies the FIR correction coefficients to the sampled RADAR response from the metal plate (or other calibration means) waveform to find the interim-correct result, z. This operation may also include IIR coefficients, if desired. Next, the cost function is found by:

$$C = \sum_{n=0}^{N-1} (z_n - r_n)^2 \frac{w_n}{\|w\|} \quad \text{Equation 7}$$

Where $z_n$ is the indexed version of z and $w_n$ is a weighting function that adjusts the importance of each part of the waveform in order to minimize or maximize specific features.

FIG. 5 shows an actual measured UWB radar response of a metal-plate reflector (homogeneous material) and its subsequent equalization and correction. The original waveform (dotted line) is a measured waveform under a controlled scenario such as described with reference to step 310 of FIG. 3. Again, this is, for example, a measured GPR reflection off a homogeneous material such as a metal plate. The gray line is the corrected response formed after carrying out the method described with reference to FIG. 3 on devices described with reference to FIGS. 1 and 2. The coefficients (such as coefficients 330 of FIG. 3) determined, which are used to change the original waveform into the resulting waveform, are then used to equalize/modify the waveform or waveform characteristics when measuring the composition of a heterogeneous material. In the case shown in FIG. 5, the goal of the correction is to produce the most compact waveform possible, while eliminating 'ringing' and 'smearing'.

FIG. 6 shows a coefficient set used to correct and equalize inputted waveform as defined based on carrying out the steps of the disclosed technology. In this case, a 190-point FIR coefficient set has been developed. This coefficient set comprises the coefficients 330 used to modify any incoming data to produce higher quality output data. The resultant coefficient set of 190 unique taps is applied to all subsequent measurements, such that the greatest possible resolution is achieved. This allows closely-spaced heterogeneous material transitions to be discerned and identified, as well as a higher degree of precision in measuring layer thicknesses for a given frequency and bandwidth measurement device or system.

Figure 7:
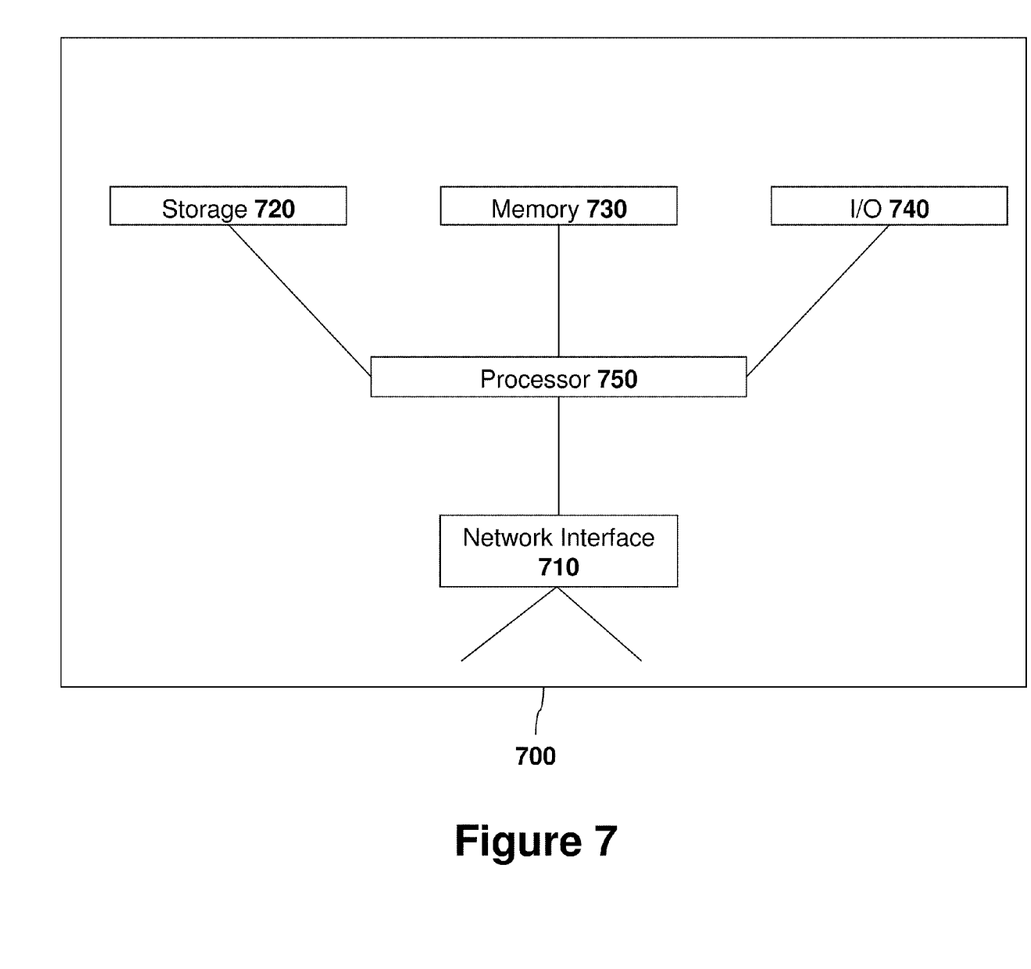
FIG. 7 shows a high-level block diagram of a measurement device that may be used to carry out the disclosed technology.

FIG. 7 shows a high-level block diagram of a measurement device that may be used to carry out the disclosed technology. Measurement device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A measurement device 700 also includes one or a plurality of input network interfaces for communicating with other devices via a network (e.g., the internet). A measurement device 700 also includes one or more output network interfaces 710 for communicating with other devices. Measurement device 700 also includes input/output 740 representing devices which allow for user interaction with the computer 700 (e.g., display, keyboard, mouse, speakers, buttons, etc.). One skilled in the art will recognize that an implementation of an actual measurement device will contain other components as well, and that FIG. 7 is a high level representation of some of the components of such a measurement device for illustrative purposes. It should also be understood by one skilled in the art that the method and devices depicted in FIGS. 1 through 4 may be implemented on a device such as is shown in FIG. 7.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

We claim:

1. A ground-penetrating radar device comprising:
   antenna(s) transmitting and receiving ultra-wideband pulses;
   an analog-to-digital converter;
   a delay-tap filter equalizing a measurement response received by said antenna;
   a measurement system for determining the composition of a heterogeneous material, wherein said equalizing is equalizing of a response off a road surface based on a previously determined response off a homogeneous material.

2. The device of claim 1, wherein said previously determined response is a response at a known distance from said homogeneous material.

3. The device of claim 1, wherein coefficients of said previously determined response and present said equalizing are determined based on variations in a said antenna.

4. The device of claim 1, wherein coefficients of said previously determined response and present said equalizing are determined based on temperature.

5. The device of claim 1, wherein said delay-tap filter minimizes the width and delays of each of a plurality of pulses transmitted by said antenna.

6. A ground-penetrating radar device comprising:
   antenna(s) transmitting and receiving ultra-wideband pulses;
   an analog-to-digital converter;
   a delay-tap filter equalizing a measurement response received by said antenna;
   a measurement system for determining the composition of a heterogeneous material, wherein an equalizing profile for said equalizing is selected based on a known feature of said composition of said heterogeneous material.

7. The device of claim 6, wherein said equalizing is performed in real-time.

8. The device of claim 6, wherein said equalizing is performed in post processing.

9. A ground-penetrating radar device comprising:
   antenna(s) transmitting and receiving ultra-wideband pulses;
   an analog-to-digital converter;
   a delay-tap filter equalizing a measurement response received by said antenna;
   a measurement system for determining the composition of a heterogeneous material, wherein an equalizing profile of said delay tap filter is configured based on an equalizing of a measurement of a homogeneous material in comparison to a reference waveform;
   and said equalizing is an equalizing of a measurement of said heterogeneous material.

* * * * *